United States Patent
Dueker et al.

(10) Patent No.: US 9,259,876 B2
(45) Date of Patent: Feb. 16, 2016

(54) METHOD FOR PRODUCING A SUBSTANTIALLY SHELL-SHAPED, FIBER-REINFORCED PLASTIC PART

(71) Applicant: MBB FERTIGUNGSTECHNIK GMBH, Beelen (DE)

(72) Inventors: Martin Dueker, Guetersloh (DE);
Robert Buehlmeyer, Herzebrock-Clarholz (DE);
Manfred Ringelmann, Sassenberg (DE)

(73) Assignee: MBB Fertigungstechnik GmbH, Beelen (DE)

( * ) Notice: Subject to any disclaimer, the term of this patent is extended or adjusted under 35 U.S.C. 154(b) by 408 days.

(21) Appl. No.: 13/851,315

(22) Filed: Mar. 27, 2013

(65) Prior Publication Data

US 2013/0256941 A1  Oct. 3, 2013

(30) Foreign Application Priority Data

Mar. 27, 2012  (DE) .......................... 10 2012 006 034

(51) Int. Cl.
| | |
|---|---|
| B29C 51/02 | (2006.01) |
| B29C 70/46 | (2006.01) |
| B29C 33/02 | (2006.01) |
| B29C 35/16 | (2006.01) |
| B29C 35/02 | (2006.01) |
| B29K 105/08 | (2006.01) |

(52) U.S. Cl.
CPC ................. *B29C 51/02* (2013.01); *B29C 33/02* (2013.01); *B29C 70/46* (2013.01); *B29C 35/16* (2013.01); *B29C 2035/0283* (2013.01); *B29C 2793/0018* (2013.01); *B29K 2105/0872* (2013.01)

(58) Field of Classification Search
CPC .......... B29C 51/02; B29C 33/02; B29C 70/46
See application file for complete search history.

(56) References Cited

U.S. PATENT DOCUMENTS

| | | | | | |
|---|---|---|---|---|---|
| 4,052,523 | A | * | 10/1977 | Rhodes ..................... | B32B 3/12 428/116 |
| 4,244,853 | A | * | 1/1981 | Serafini .................. | C08G 73/10 427/221 |
| 4,908,494 | A | * | 3/1990 | Faiz ....................... | B23K 26/40 219/121.66 |
| 5,080,851 | A | * | 1/1992 | Flonc ..................... | B29B 11/16 156/222 |
| 5,348,798 | A | * | 9/1994 | Berghuis ................. | B29C 33/52 264/258 |
| 5,480,603 | A | * | 1/1996 | Lopez .................... | B29B 11/16 264/131 |
| 7,128,869 | B2 | | 10/2006 | Habisreitinger et al. | |
| 8,071,008 | B1 | * | 12/2011 | Brachos ................. | B29C 70/46 264/234 |
| 2007/0160822 | A1 | * | 7/2007 | Bristow .................. | B29C 43/02 428/304.4 |
| 2009/0224426 | A1 | * | 9/2009 | Micarelli ................ | B29C 43/10 264/319 |

FOREIGN PATENT DOCUMENTS

| | | |
|---|---|---|
| DE | 198 29 352 | 1/2000 |
| EP | 1 301 322 | 4/2003 |

\* cited by examiner

*Primary Examiner* — Matthew Daniels
(74) *Attorney, Agent, or Firm* — Michael J. Striker

(57) ABSTRACT

A method for producing a substantially shell-shaped, fiber-reinforced plastic part includes preheating a material blank that is formed of a fibrous material impregnated with a matrix material using a heating device to ensure the formability and placing the preheated material blank into a shaping tool having an upper die and a lower die. The shaping tool is then closed to form the material blank. Using a cooling device, at least one shaping surface of the shaping tool, with the material blank inserted, is at least partially cooled.

23 Claims, 4 Drawing Sheets

METHOD FOR PRODUCING A SUBSTANTIALLY SHELL-SHAPED, FIBER-REINFORCED PLASTIC PART

CROSS-REFERENCE TO A RELATED APPLICATION

The invention described and claimed hereinbelow is also described in German Patent Application DE 10 2012 006034.3, filed on Mar. 27, 2012. This German Patent Application, subject matter of which is incorporated herein by reference, provides the basis for a claim of priority of invention under 35 U.S.C. 119(a)-(d).

BACKGROUND OF THE INVENTION

The invention relates to a method for producing a substantially shell-shaped, fiber-reinforced plastic part and to a system for carrying out this method Shell-shaped, fiber-reinforced plastic parts of the type are found in numerous technical fields of use, for example, the field of structural parts of motor vehicles. Shell-shaped, fiber-reinforced plastic parts are required for use in columns, supports, crash elements, seats, or the like. In light of the high piece numbers, achieving automated production as well as efficiency of production are particularly important.

DE 198 29 352 A1 discloses a method of forming of a flat material blank made of fiber-reinforced plastic in a shaping tool. In order to attain the flexibility of the material blank required for forming, the material blank is preheated before forming. To this end, an appropriate heating device is placed in the shaping tool before forming is carried out. After preheating, the heating device is removed from the shaping tool and the shaping tool is closed in order to form the material blank. The actual forming takes place in a first step by way of a molding die and, in a second step, by applying compressed air or the like to the material blank.

The disadvantage of the known method is the expected, material-related limitation of the shaping of the plastic part.

EP 1 301 322 B1 discloses another known method in which a material blank of a fiber mat is placed into the shaping tool and is sprayed over the entire surface with a reactive matrix material, namely a reactive matrix resin in this case. In order to form the material blank, the shaping tool is then closed and held in the closed state until the matrix resin has cured. In order to spray the material blank with a matrix resin as described above, the matrix resin is injected into the cavity between the upper die and the lower die of the shaping tool with the shaping tool closed. This so-called resin-injection procedure (RTM, "Resin Transfer Moulding") makes it possible to fully automatically produce plastic parts having extraordinarily good surface quality.

The subsequent application of a matrix resin into the material blank comprising a highly flexible fibrous material results in simple handling of the material blank before placement into the shaping tool. Such operation results in high flexibility in the shaping of the plastic part to be produced. However, introducing the matrix resin into the fibrous material in an optimal manner is challenging in terms of the system and the process.

SUMMARY OF THE INVENTION

The present invention overcomes the shortcomings of known arts, such as those mentioned above.

In an embodiment, the invention provides a method for automated production for forming or producing the fiber-reinforced plastic part that is highly flexible.

In an embodiment, the inventive method bases the production process on a material blank comprising a fibrous material impregnated with a matrix material. Such material is referred to as "prepreg material". A prepreg material is impregnated in the starting state with a matrix resin that liquefies when heated. Continued heating above an activation temperature ultimately results in curing of the matrix resin. Alternatively or additionally, the fiber mat can comprise adhesive threads, which are provided with the matrix resin in a corresponding manner, in both cases, the matrix resin present in the fiber mat liquefies when heated and subsequently impregnates the fiber mat as described above.

An advantageous property of prepreg material is that a corresponding material blank, when preheated accordingly, can be formed into largely any shape while retaining a certain dimensional stability and, therefore, automated handling of the material blank is possible. The material blank is preheated accordingly before placement into the shaping tool.

Of interest now is the fact that at least one shaping surface of the shaping tool, with the material blank inserted, becomes at least partially cooled and/or is already at least partially cooled via a cooling device. This cooling, which takes place contrary to the preheating of the material blank per se, has the effect of preventing the material blank from adhering to the shaping surfaces of the shaping tool (the material blank is usually sticky due to the preheating). A further effect is that the cooling makes targeted stiffening of the material blank possible, for example, in order to ensure trimming or punching of the material blank without a "smear effect".

The appropriate control of preheating and of cooling is significant in the present invention. For example, the stiffening of the material blank takes place at least substantially after forming. It is thereby ensured that the material flexibility attained via the preheating and the material stiffening attained via the cooling are applied in a targeted manner.

In an embodiment, the material blank is contoured via a separative machining operation, which provides the material blank with an undersized contour. The further preferred embodiments relate to compression, which imparts the final shape, is accompanied by simultaneous curing and which, when carried out accordingly, results in a transformation of the undersized contour into a nominal-dimension contour by material moving in the material blank.

In an embodiment, in the compression of the material blank, matrix material is displaced from the material blank into overflow chambers in the compression tool. The overflow into the overflow chambers takes place via channels, in which predetermined breaking points form after curing. Cleaning of the material blank of matrix material that emerges involves a defined breaking-off of the predetermined breaking points using a contouring tool.

In an embodiment, the invention provides a system equipped with a shaping tool, in particular, an upper die and a lower die, wherein the shaping tool is closed after insertion of a material blank in order to form the material blank.

A material blank comprising a prepreg material is placed into the shaping tool. To ensure the formability of the material blank before insertion, a heating device is provided. The heating device is used for preheating the material blank at least partially. Furthermore, the proposed system comprises a cooling device. The cooling device is used to cool or at least partially cool the at least one shaping surface of the shaping tool, with the material blank inserted.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

Figure 1A:
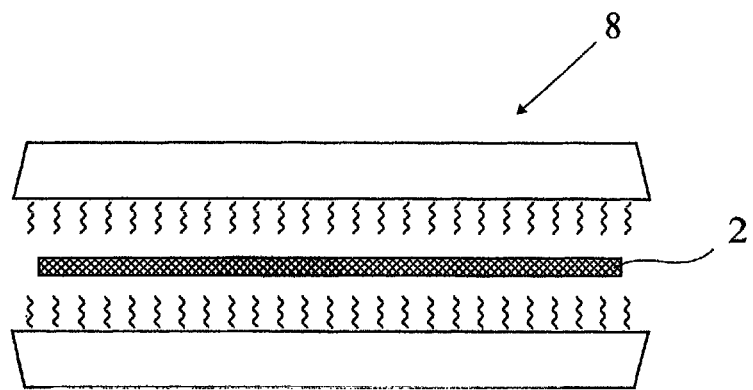
FIG. 1a depicts the proposed preheating of a material blank in a heating device.

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The inventive system, as depicted in FIGS. 1 to 4, is used to carry out a method for producing a substantially shell-shaped, fiber-reinforced plastic part 1. An unlimited number of embodiments of the plastic part 1 are feasible, as mentioned above.

In a method step, a material blank 2 is placed into a shaping tool 3. Shaping tool 3 comprises an upper die 4 and a lower die 5 (FIG. 1).

In a further method step, the shaping tool 3 is closed along a closing direction 6 in order to shape the material blank 2. The upper die 4 and the lower die 5 have shapes that correspond to one another. When the shaping tool 3 is closed, a cavity 7 remains, which is filled with the material blank 2. The forming of the material blank 2 is determined in the usual manner by way of the shape of the upper die 4 and the lower die 5.

The material blank 2 substantially comprises a fibrous material. The fibrous material is impregnated with a matrix material, namely a matrix resin. This material is the prepreg material, as described above. The design of the prepreg material can differ depending on the application. The prepreg material is preferably a CRP-fabric prepreg material. Basically, the prepreg material can be any type of duroplastic or thermoplastic prepreg material, depending on the application.

The material blank 2 comprising the prepreg material is at least partially preheated by way of a heating device 8 before placement into the shaping tool 3. This preheating ensures the formability thereof. FIG. 1a schematically depicts the heating device 8 during the preheating of the material blank 2. FIG. 1a shows that the entire material blank 2 is preheated.

Figure 1B:
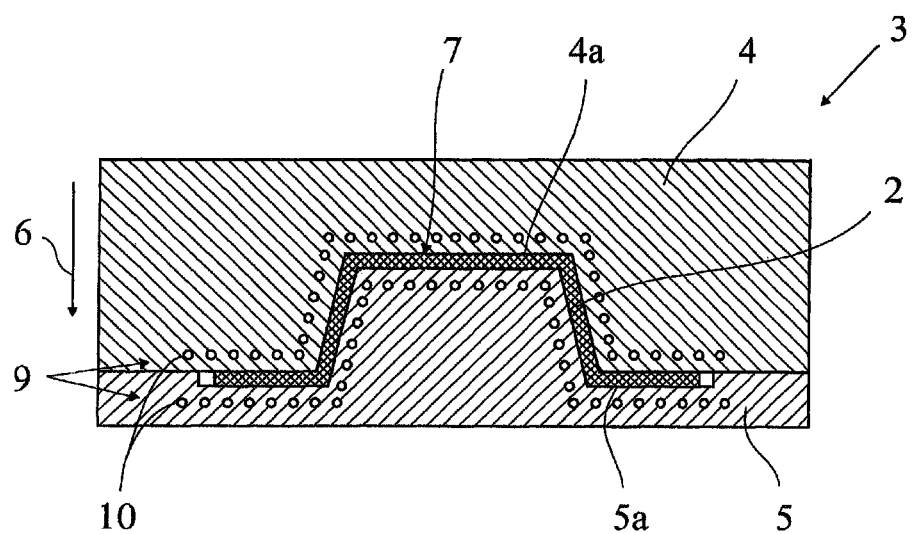
FIG. 1b depicts the proposed forming of the material blank in a shaping tool.

The shaping tool 3 is equipped with a cooling device 9, which is indicated in FIG. 1b by cooling pipes 10. One possibility for cooling in this case is to pass a cooling fluid through the cooling pipe 10.

The shaping tool 3 comprises opposing, shaping surfaces 4a, 5a. These opposing, shaping surfaces 4a, 5a enclose the material blank 2 during forming. Preferably, both shaping surfaces 4a, 5a of the shaping tool 3 become at least partially cooled and/or at least already cooled by way of the cooling device 9, with the material blank 2 inserted. This means that, in one variant, the cooling is already underway when the material blank 2 is inserted. In another variant, the cooling starts after the material blank 2 has been inserted.

FIG. 1b shows that cooling takes place by way of the cooling device 9 across the entire surface and on both sides of the material blank 2. Therefore, the entire surface of the material blank 2 is prevented from adhering to the upper die 4 and the lower die 5. This is relevant since prepreg materials usually have sticky surfaces even at room temperature, which is problematic, inter alia, for the removal thereof from the shaping tool 3. Furthermore, the all-over cooling of the material blank 2 results in a corresponding all-over stiffening of the material. The stiffening simplifies the handling of the material blank 2 for the subsequent method step and the processability of the material blank 2, in particular in terms of contouring.

In an embodiment, the material blank 2 is stored in a cooled state before the above-described preheating. The cooled state prevents a chemical reaction of the prepreg material. The term "react" refers to any type of chemical reaction, in particular, an unwanted crosslinking of the prepreg material. The storage temperature is preferably below −10° C. At such low temperatures, the prepreg material is only barely or not at all formable, depending on the design, wherefore the above-described preheating is particularly significant. Preferably, the temperature difference between the storage temperature and the preheating temperature is between approximately 40° C. and approximately 90° C.

The preheating of the material blank 2 by the heating device 8 preferably takes place below the activation temperature of the prepreg material. This prevents premature curing of the prepreg material. It has been shown in trials, however, that preheating to a temperature clearly above room temperature, for example, above approximately 40° C. and/or above approximately 60° C., is advantageous.

In an embodiment, the preheating of the material blank 2 is carried out precisely such that the material blank 2 is formable yet transportable. Easy handling of the material blank 2 is therefore ensured. Advantageously, either as an alternative or in addition, the preheated material blank 2 placed in the shaping tool 3 adheres not at all or only slightly to the cooled, shaping surfaces 4a, 5a of the shaping tool 3. This effect is due to the temperature difference between the preheating and the cooling of the material blank 2 and the shaping surfaces 4a, 5a.

The proposed cooling of the shaping surfaces 4a, 5a of the shaping tool 3 is furthermore preferably carried out such that the material blank 2 itself, which corresponds to these surfaces 4a, 5a, cools and is thereby stiffened. Care must be taken in the approach to ensure that the stiffening does not hinder the forming of the material blank 2 in the shaping tool 3. This is achieved by forming the material blank 2 immediately after placement thereof in the shaping tool 3 by closing the shaping tool 3. As such, the stiffening of the material blank 2 induced by the cooling of the shaping surfaces 4a, 5 takes place substantially after forming. Of course, the material blank 2 stiffens to a certain extent already upon insertion of the material blank 2 if cooling is already underway during insertion.

Via experimentation it was demonstrated that cooling the applicable shaping surfaces 4a, 5a of the shaping tool 3 to a temperature below approximately 10° C. (and preferably less than approximately 8° C.) yields optimal results. Preferably, the temperature difference of the heated material blank 2 relative to the cooled surfaces 4a, 5a of the shaping tool 3 is between approximately 30° C. and 80° C.

The cooling of the shaping tool 3 is effective in the production of fiber-reinforced plastic parts 2 having convex or concave shapes having steep slopes and a considerable vertical extension. This is due to the fact that, in such designs, the capability of the material blank 2 to move in the shaping tool 3 is advantageous and, in some cases, even necessary. The capability of the material blank 2 to move in the shaping tool 3 is particularly advantageous in that adhesion of the material blank 2 to the shaping surfaces 4a, 5a of the shaping tool 3 is reduced.

Figure 2:
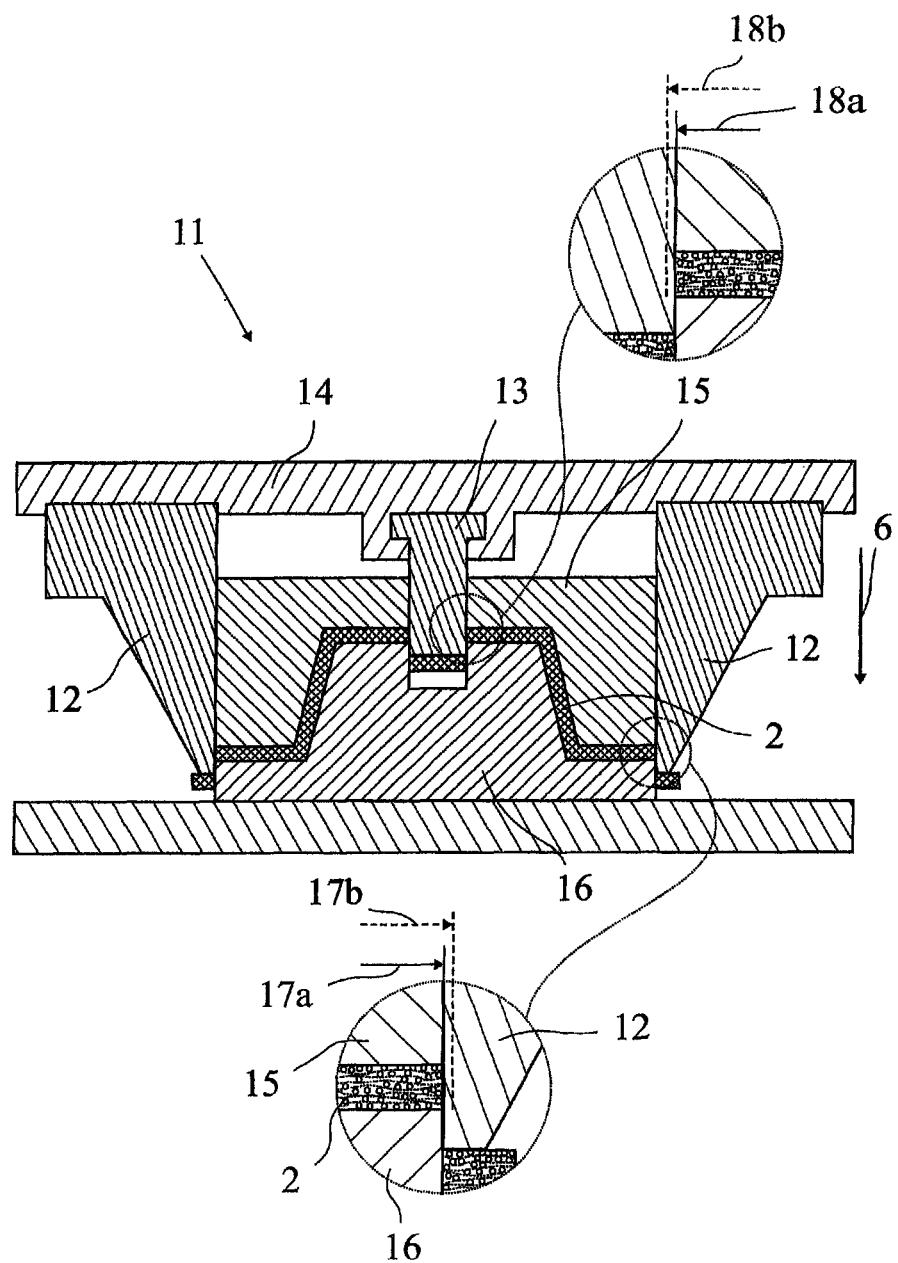
FIG. 2 depicts the proposed contouring of the material blank using a contouring tool.

FIG. 2 depicts that the formed and at least partially cooled material blank 2 is contoured here via a separative machining operation. "Contouring" refers to the creation of outer and inner contours. As shown, the contouring comprises trimming, namely the removal of unwanted edge regions of the material blank 2, and punching the material blank 2. Therefore, the contouring tool 11, which is designed separately of the shaping tool 3, comprises a trimming tool 12 and a punching tool 13. Depending on the design of the plastic part 1 to be produced, the contouring tool 11 must be equipped with appropriate trimming tools, punching tools, or the like.

In the embodiment depicted, the contouring tool 11 comprises a head part 14, on which the trimming tool 12 and the punching tool 13 are disposed. The trimming tool 12 is a cutting blade. The punching tool 13 is a punch. The trimming and the stamping can each be carried out to create any types of contours.

Similar to the shaping tool according to FIG. 1b, the contouring tool 11 is equipped with an upper die 15 and a lower die 16, for fixing the material blank 2. The head part 14 is designed such that it can move along the closing direction 6 of the upper die 15 and the lower die 16. The trimming and stamping take place in a single working step during this motion of the head part 14.

As contouring is carried out, an undersized contour (17a, 18a) is preferably formed in the material blank (2). The undersizing (17a, 18a) can be up to 1 mm, depending on the absolute dimensions of the plastic part 1 and depending on the prepreg material. It is also possible for an undersizing (17a, 18a) of more than 1 mm to occur.

In a subsequent method step, the undersized contour (17a, 18a) is transformed into a nominal-dimension contour (17b, 18b). The forming and, optionally, the contouring are followed by at least one curing step. Preferably, the curing of the prepreg material first takes place in predetermined regions by way of the local, targeted application of heat. This can be achieved using preheated punches placed onto the applicable regions.

Preferably, local curing takes place in the region of perforations. For that matter, the placement of the applicable punch (preferably comprising an annular surface), induces local compression of the material blank 2 and a corresponding outward displacement of the matrix material located there. Therefore, a thin layer of matrix material forms on the inner surface of the perforation, which cures due to the preheating of the punch. A die can be provided within the perforation, which provides a mating shape for the matrix material that emerges. The die is used as a mold, as it were, for the matrix material that emerges. By way of this targeted curing, it also is possible to produce complicated edge regions free of fibers.

In an embodiment, the formed and (optionally) contoured material blank 2 is next thermally cured overall. This operation or step is highlighted in FIG. 3. Preferably, the formed and (optionally) contoured material blank 1 also is compressed in a compression tool 19 in order to impart the final shape. The FIG. 3 embodiment is particularly compact in that the thermal curing and the compression are carried out substantially simultaneously in a single curing tool 20. In this case, the curing tool 20 corresponds to the aforementioned compression tool 19.

The curing tool 20 also is equipped with an upper die 21 and a lower die 22. The curing tool 20 is designed in the manner of a press, and therefore the upper die 21 is pressed in the closing direction 6 with great force against the lower die 22. First, the material blank 2 is compressed. Furthermore, a heating device 23 is assigned to the curing tool 20, by way of which the material blank 2 is heated above the activation temperature. The material blank 2 is preferably heated via the heating device 23 to a curing temperature above 100° C.

The shaping surfaces of the upper die 21 and the lower die 22 of the curing tool 20 are preferably coated such that the material blank 2 can be easily removed. One possible coating in this case is a non-stick coating, for example.

Figure 3:
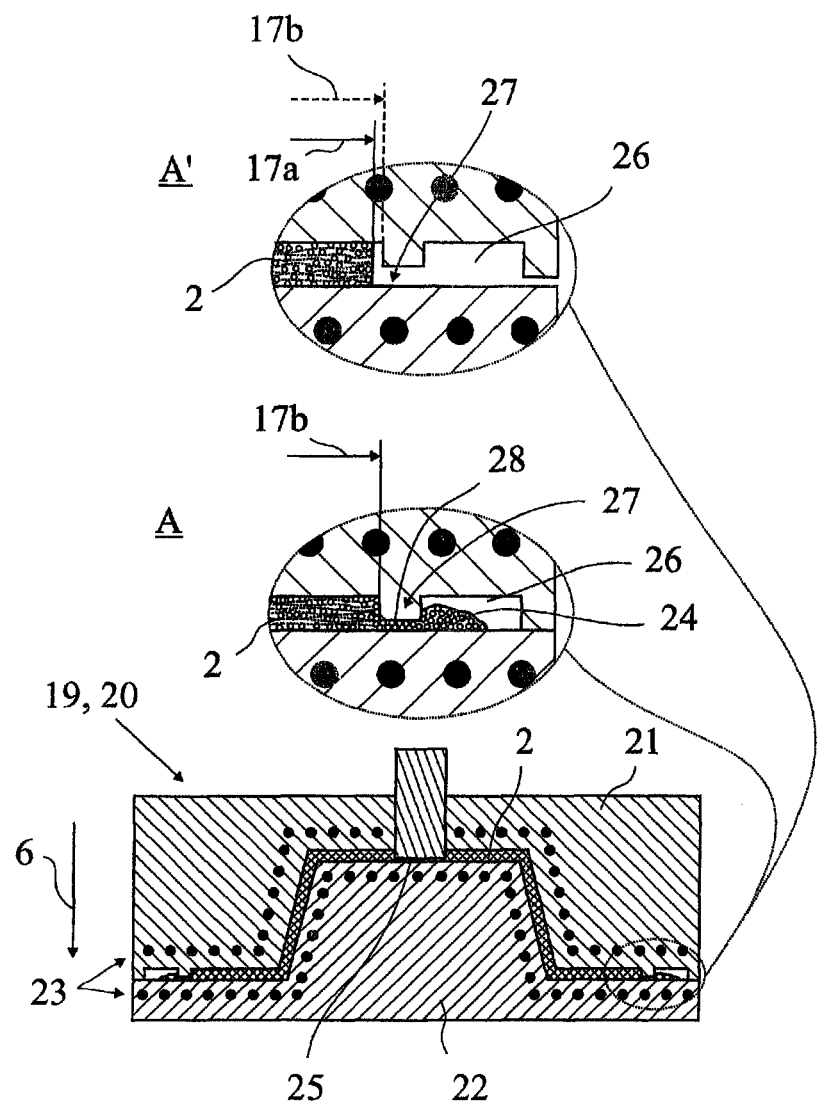
FIG. 3 depicts the proposed compression and curing of the material blank using a curing tool.

In respect of the compression and curing process depicted in FIG. 3, the compression displaces matrix material out of the material blank 2. The displaced matrix material 24 flows into overflow chambers 25, 26 in the compression tool 19 or the curing tool 20 (as depicted). The still-uncompressed state of the material blank 2 is shown in the detailed view A' in FIG. 3. A comparison of the two detailed views A, A' shows that the undersized contour 17a is transformed into the particular nominal-dimension contour 17b via the resultant motion of material in the material blank 2.

Figure 4:
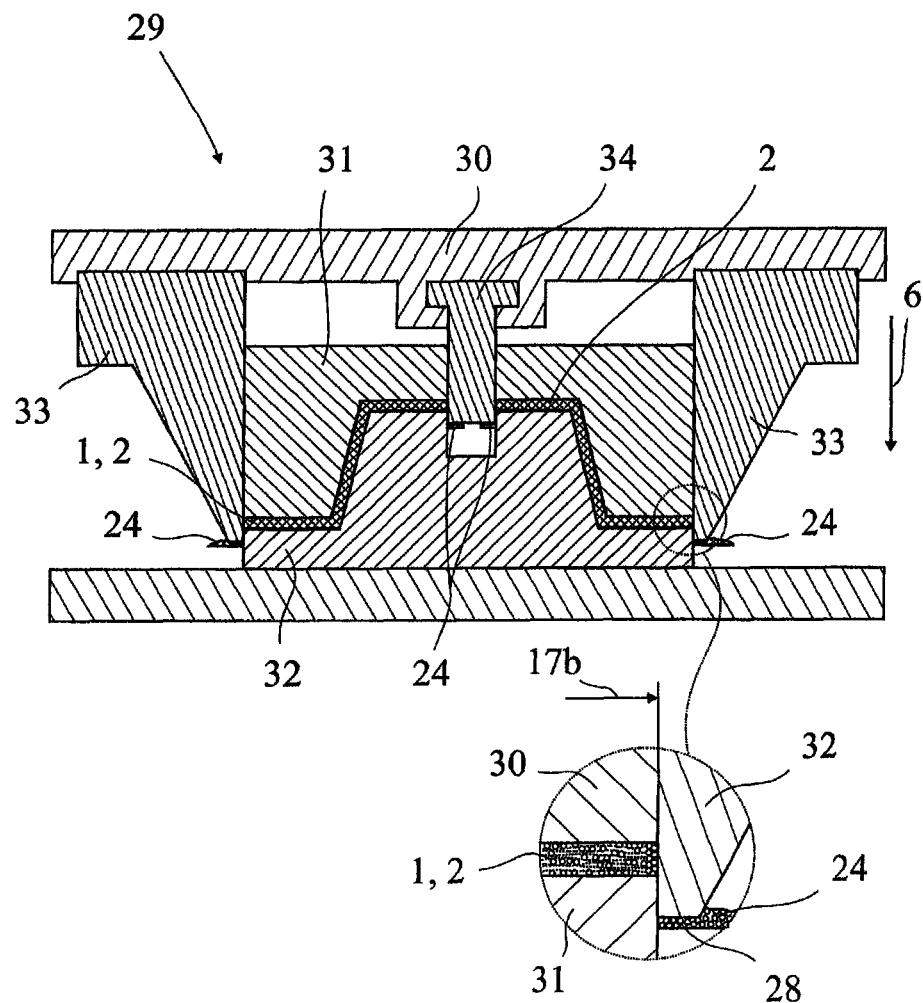
FIG. 4 depicts the proposed cleaning of the material blank using a contouring tool.

According to FIG. 3, the curing tool 20 is designed so that the displaced and cured matrix material 24 is easily removed from the material blank 2 within the scope of cleaning. Preferably, the displaced matrix material 24 flows at least partially via channels 27 into the overflow chambers 26, wherein the channels 27 are designed such that the matrix material 24 remaining in the channels 27 functions as a predetermined breaking point 28 after curing. In order to ensure a predefined fracture behavior of the predetermined breaking point, the channel 27 has a particularly flat cross section, and therefore the cured matrix material 24 remaining in the channel 27 is correspondingly thin and brittle. Ideally, this part of the matrix material 24 forms a thin web having a height of less than 0.5 mm in the cross section. The term "channel" is intended to be broadly interpreted herein as comprising any passage for displaced matrix material 24. In order to implement complicated geometries, in particular undercuts, the shaping tool 3 and the contouring tool 11 are equipped with sliding elements, the advancing direction of which is not oriented in the closing direction 6 of the upper tool 4, 21 and the lower tool 5, 22.

in the embodiment according to FIG. 4, a contouring tool 29 is provided for cleaning, which corresponds to the contouring tool 11 depicted in FIG. 2. Similarly, a head part 30, an upper die 31, a lower die 32 and a cleaning tool 33 and a punching tool 34 also are provided. As shown, the contouring tool 29 ensures that the predetermined breaking points 28 created by the aforementioned channels 27 are broken off. This type of cleaning of the material blank 2 is particularly advantageous for duroplastic prepreg materials since cured duroplastic materials are very difficult to cut.

The compression and curing depicted in FIG. 3 may be implemented such that a thin layer of matrix material remains on the edge after curing, which forms a type of termination of the particular edge. Shaping elements, in particular dies, are provided that function as molds for the emerging matrix material (as described above in the context of local curing).

The invention also includes a system for carrying out the proposed method per se. The system comprises a single press that has a series of progressive dies. The shaping tool 3 depicted in FIG. 1b, the contouring tool 11 depicted in FIG. 2, the curing tool 20 depicted in FIG. 3 and the cleaning and contouring tool 29 depicted in FIG. 4 can each be designed as a progressive die. However, it also is feasible for each of the aforementioned tools to be structurally separate.

The system is linked together in an automated manner, preferably via gripper transfer or robot-supported handling systems. This ensures a certain dimensional stability of the material blank 2 during the entire production procedure, as described above.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for producing a substantially shell-shaped, fiber-reinforced plastic part, comprising steps of:
    preheating a material blank comprising a fibrous material impregnated with a thermally curable matrix material using a heating device to ensure the formability thereof;
    placing the preheated material blank into a shaping tool that comprises and upper die and a lower die;
    closing the shaping tool to form the material blank;
    with the material blank inserted, at last partially cooling at least one shaping surface of the shaping tool to a temperature of less than approximately 10° C. using a cooling device;
    placing the material blank in a curing tool;
    compressing and thermally curing the material blank in the curing tool.

2. The method according to claim 1, further comprising storing the material blank in a cooled state before preheating in order to prevent a chemical reaction of the thermally curable matrix material.

3. The method according to claim 2, wherein the storage temperature for the cooled state is below approximately −10° C.

4. The method according to claim 2, wherein a difference between the storage temperature and the preheating temperature is between approximately 40° C. and approximately 90° C.

5. The method according to claim 1, wherein the preheating temperature of the material blank is below the activation temperature of the thermally curable matrix material.

6. The method according to claim 1, wherein the material blank is at least partially preheated to at least approximately 40° C.

7. The method according to claim 1, wherein the material blank is at least partially preheated to at least approximately 60° C.

8. The method according to claim 1, wherein the preheated material blank is formable yet transportable, and/or when placed into the shaping tool, adheres not at all or only barely to the cooled, shaping surfaces of the shaping tool.

9. The method according to claim 1, wherein the shaping surfaces of the shaping tool are at least partially cooled such that the material blank corresponding to these surfaces is cooled.

10. The method according to claim 9, wherein the material blank is formed immediately after insertion into the shaping tool by closing the shaping tool so that stiffening of the material blank induced by the cooling of the shaping surfaces takes place substantially after the forming.

11. The method according to claim 1, wherein the shaping surfaces of the shaping tool are at least partially cooled to a temperature of less than approximately 8° C.

12. The method according to claim 1, wherein the shaping surfaces of the shaping tool are at least partially cooled to realize a temperature difference of the heated material blank relative to the cooled surfaces of the shaping tool of between approximately 30° C. and approximately 80° C.

13. The method according to claim 1, wherein the shaped and at least partially cooled material blank is contoured via a separative machining operation.

14. The method according to claim 13, wherein the contouring comprises trimming and/or punching of the material blank.

15. The method according to claim 13, wherein the contouring is carried out in a contouring tool that is separate from the shaping tool, the contouring tool comprising a trimming tool and/or a punch.

16. The method according to claim 13, wherein in the contouring, an undersized contour is formed in the material blank.

17. The method according to claim 13, wherein the formed and contoured material blank is locally cured in predetermined regions by the targeted application of heat.

18. The method according to claim 17, wherein the local curing takes place in a region of perforations.

19. The method according to claim 13, further comprising using compression to transform the undersized contour into a nominal-dimension contour by material moving in the material blank.

20. The method according to claim 13, wherein in response to compression, the matrix material is displaced out of the material blank and the displaced matrix material flows into overflow chambers in the curing tool.

21. The method according to claim 20, wherein the displaced matrix material flows at least partially via channels into the overflow chambers, and in that the matrix material remaining in the channels function as predetermined breaking points after curing.

22. The method according to claim 21, wherein the compressed and cured material blank is cleaned of the matrix material displaced from the material blank.

23. The method according to claim 22, wherein the cleaning is performed by breaking off the predetermined breaking points.

\* \* \* \* \*